United States Patent [19]

Stelter et al.

[11] Patent Number: 4,926,329
[45] Date of Patent: May 15, 1990

[54] ARRANGEMENT FOR CONTROLLING THE POWER TRANSMISSION OF AN ALL-WHEEL DRIVE VEHICLE

[75] Inventors: Norbert Stelter, Weissach; Goetz Richter, Muehlacker; Juergen Schneider, Weissach, all of Fed. Rep. of Germany

[73] Assignee: Dr. Ing. H.c.F. Porsche AG, Weissach, Fed. Rep. of Germany

[21] Appl. No.: 24,068

[22] Filed: Mar. 10, 1987

[30] Foreign Application Priority Data

Mar. 11, 1986 [DE] Fed. Rep. of Germany ....... 3608059

[51] Int. Cl.$^5$ .............................................. B60K 17/34
[52] U.S. Cl. ............................. 364/424.01; 364/424.1; 180/248
[58] Field of Search ...................... 364/424.01, 426.01, 364/424.1; 180/244-248

[56] References Cited

U.S. PATENT DOCUMENTS

| 3,411,601 | 11/1968 | Arkus-Duntov | 180/44 |
| 4,086,563 | 4/1978 | Bachman | 340/52 B |
| 4,353,272 | 10/1982 | Schneider et al. | 74/859 |
| 4,466,502 | 8/1984 | Sakai | 180/247 |
| 4,589,511 | 5/1986 | Leiber | 180/244 |
| 4,701,682 | 10/1987 | Hirotsu et al. | 364/426 |
| 4,715,662 | 12/1987 | Van Zanten et al. | 364/426 |
| 4,754,835 | 7/1988 | Stelter et al. | 180/248 |

FOREIGN PATENT DOCUMENTS

| 0043237 | of 0000 | European Pat. Off. | |
| 3437436 | 4/1986 | Fed. Rep. of Germany | |
| 176119 | of 0000 | Japan | |
| 58-126224 | 7/1983 | Japan | |
| 0191431 | 8/1986 | Japan | 180/244 |
| 0015127 | 1/1987 | Japan | 180/247 |
| 1193602 | of 0000 | United Kingdom | |
| 1168031 | 10/1969 | United Kingdom | |
| 2118666 | 11/1983 | United Kingdom | |

Primary Examiner—Parshotam S. Lall
Assistant Examiner—V. N. Trans
Attorney, Agent, or Firm—Barnes & Thornburg

[57] ABSTRACT

In an arrangement for the control of the power transmission of a four-wheel drive vehicle, a main driving axle is driven directly and an auxiliary driving axle is driven via a continuously controllable longitudinal clutch by an internal combustion engine via a clutch-transmission unit. From a desired performance and the speed of the vehicle, a desired traction force of all the wheels is determined. From this desired traction force, and by a distribution factor that is dependent on operating driving parameters, the control quantity is obtained for the control of the longitudinal clutch. In addition, the longitudinal clutch can be controlled alone or in combination with the control quantity by an additional control quantity obtained by squaring of a speed difference at the longitudinal clutch.

16 Claims, 5 Drawing Sheets

ARRANGEMENT FOR CONTROLLING THE POWER TRANSMISSION OF AN ALL-WHEEL DRIVE VEHICLE

BACKGROUND AND SUMMARY OF THE INVENTION

The present invention relates to an arrangement for the control of the power transmission of an all-wheel drive vehicle, having a main driving axle equipped with the transverse differential, and an auxiliary driving axle that is driven by a longitudinal clutch that is continuously controllable. The longitudinal clutch is continuously controlled by a control element and a control unit which receives input signals from a plurality of sensors and generates a control quantity for the control of the control element of the longitudinal clutch. The control quantity is determined as a function of at least one traction force of the wheels, this traction force being determined by the control unit as a function of a desired traction force and a distribution factor that is determined from at least one of the desired traction force and at least one of the input signals according to a characteristic diagram.

According to commonly-owned U.S. Pat. application Ser. No. 787,439, filed Oct. 15, 1985, an arrangement for the control of the power transmission of a four-wheel drive vehicle is provided that achieves, with a relatively small number of sensor-acquired operating and driving parameters and low control expenditures, the traction advantages of four-wheel drive combined with the advantages of the vehicle handling of two-wheel drive. This is achieved without the respective disadvantages of four-wheel and two-wheel drives.

This is primarily achieved in that commonly-owned application by determining a proportion Fzf of the traction force of the wheels at the auxiliary driving axle from an amount of a desired traction force (Fzs) that is multiplied with a distribution factor. This amount of desired traction force (Fzs) is determined from a desired performance Ps (as desired by the driver) and a vehicle speed vf. The distribution factor in this case is determined from the amount of the desired traction force (Fzs).

It is an objective of the present invention to provide an arrangement for the control of the power transmission onto the wheels of a four-wheel drive vehicle that further improves the overall driving-dynamic handling of a motor vehicle that can be achieved by the arrangment according to commonly-owned Application Ser. No. 787,439 and that particularly reacts to disturbances in a more refined way.

This and other objectives are achieved by preferred embodiments of the present invention which provide an arrangement for controlling the power transmission to the axles on an all-wheel driven motor vehicle that has a longitudinal clutch which is continuously controllable by a control unit which generates a control quantity for the control of longitudinal clutch as a function of at least one traction force of the wheels, said traction force being determined as a function of a desired traction force and a distribution factor. This distribution factor is determined from at least one of the desired traction force and at least one of the input signals according to a first characteristic diagram. The arrangement includes means for determining a driving resistance from a vehicle driving speed; a means for determining an excess traction force as a difference of the amount of the desired traction force and the driving resistance. The distribution factor is obtained at least from the amount of the excess traction force according to the first characteristic diagram 39.

In another preferred embodiment of the present invention, the arrangement is provided with means for determining a time-related change of the vehicle speed and means for determining the distribution factor from at least this time-related vehicle speed change according to the first characteristic diagram 39.

Some of the advantages of the invention are that the driving-dynamic overall handling of the motor vehicle is further improved because the arrrangement and therefore the whole vehicle system adapts itself better to inner disturbances (such as load changes) and to outer disturbances (such as abruptly changing conditions affecting the coefficient of friction in the contact between the wheel and the road).

This is achieved by determining the distribution factor df via a characteristic diagram from an excess traction force. This excess traction force is calculated by forming the difference between the amount of the desired traction force (Fzs) and a driving resistance Fv that is determined via a characteristic driving resistance curve from the vehicle speed vf.

Other objects, advantages and novel features of the present invention will become apparent from the following detailed description of the invention when considered in conjunction with the accompanying drawings.

DETAILED DESCRIPTION OF THE DRAWINGS

Figure 1:
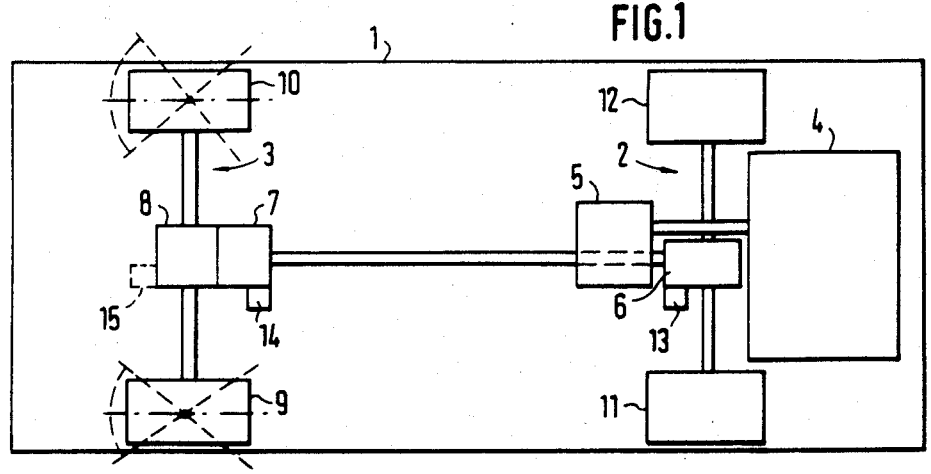
FIG. 1 is a diagrammatic view of a driving unit of a motor vehicle.

In FIG. 1, an all-wheel drive motor vehicle having a main driving axle 2 (rear axle) and an auxiliary driving axle 3 (front axle) has the reference number 1. For example, in the area of the main driving axle 2, in the shown preferred embodiment, in the rear area of the motor vehicle 1, an internal-combustion engine 4 is arranged. Via a clutch-transmission unit 5, the engine 4 drives a transverse differential gear 6 of the main driving axle 2 that can be continuously controlled in its locking effect and, in addition, via a continuously controllable longitudinal clutch 7, a differential gear 8 of the auxiliary driving axle 3. In a simple preferred embodiment, this is implemented as a conventional differential gear. However, in alternate preferred embodiments, it can be a self-locking differential gear or a differential gear that can be controlled continuously in its locking moment.

Wheels 9, 10 at the auxiliary driving axle 3 are steerable, whereas wheels 11, 12 of the main driving axle 2 are not steerable. Control elements 13, 14 for the actuating of a lock of the transverse differential 6 and of the longitudinal clutch 7 are only shown symbolically, as is a control element 15—shown by an interrupted line—of a lock of the differential of the auxiliary driving axle 3 that is required only for differential gear that can be continuously controlled in its locking moment. The control elements may be flanged onto the aggregates, may be partially or completely integrated into them, or may be at least partially arranged outside of these aggregates and be mechanically, hydraulically, pneumatically or electrically connected with them, in preferred embodiments.

Figure 2:
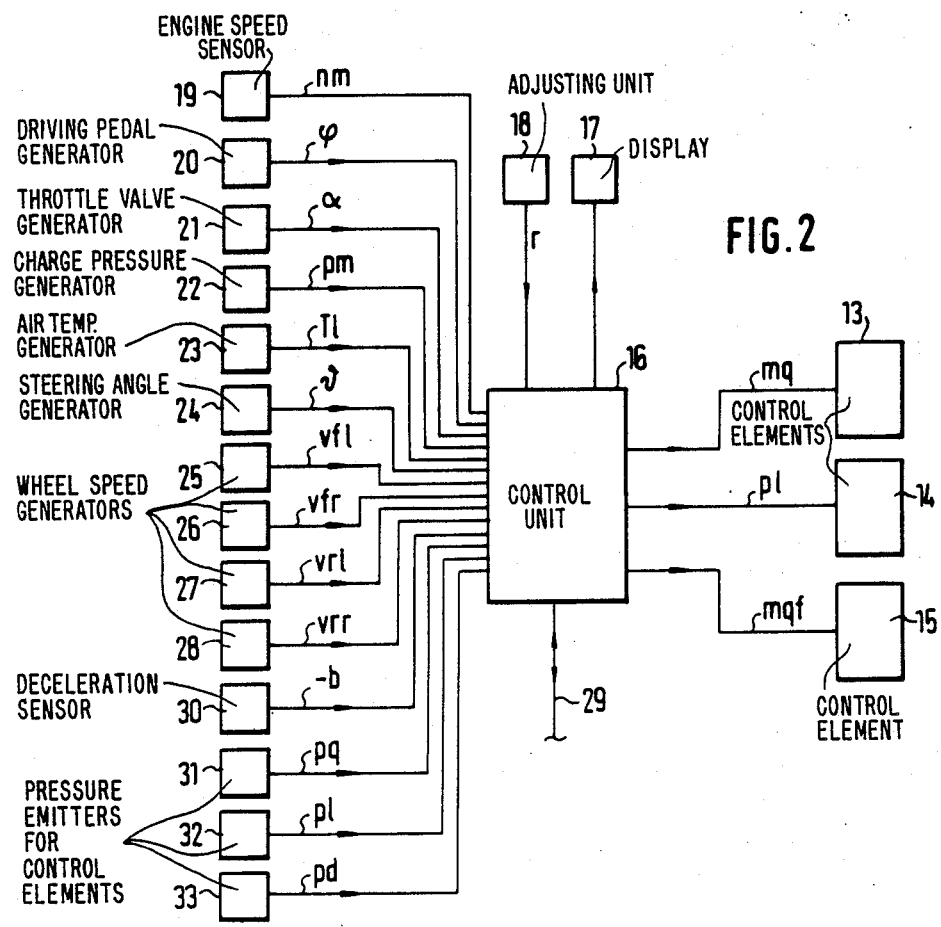
FIG. 2 is a block circuit diagram of a control unit with input and output quantities.

The control unit 16 with its input and output quantities that is shown in FIG. 2 represents a maximal configuration in which, in addition to the control element 14 of the longutidinal clutch 7, the control element 13 of the transverse differential 6 and the control element 15 of the differential 8 are also controlled. Not all of the shown connected sensors are needed for a good functioning of the arrangement.

It is assumed in this case that the control elements act linearly and are provided with cascaded control circuits. The control circuits may also be implemented in the control unit 16, in certain preferred embodiments. Possible feedback of measured values are not shown in this embodiment. The connections shown in the diagrams between the function blocks should rather be considered as lines of action.

The control unit 16, in this case, is preferably constructed on the basis of a microcomputer system. The construction of the control unit corresponds to a conventional process computer configuration with a central unit, volatile and nonvolatile memories (RAM and ROM), input and output modules, timers, etc.; the construction will therefore not be discussed in detail.

Adisplay 17 is connected to the control unit 16 that is arranged in the dashboard area of the motor vehicle and displays information to a driver on a momentary condition of the arrangement. For example, the display 17 will indicate which differential lock is actuated at what percent, and with what percentage the longitudinal clutch assigns the drive torque to the front axle. In the same way, possible errors in the arrangement can be indicated.

An adjusting unit 18 that supplies a control quantity r permits a targeted influencing of the control process. This influencing may be carried out partly by the driver and partly only by the service personnel. It should, for example, be made possible for the driver to select certain control processes as a function of a road condition; when the vehicle is stuck in snow or in loose soil, it may, for example, be useful to adjust a rigid drive-through to the auxiliary driving axle and, if necessary, also a complete locking of the differential. A possible sensory acquisition of a coefficient of friction between the wheels and a road should also be assigned to the adjusting unit 18.

The word sensory must not be understood only as a possible mere acquisition of a measured quantity or in a converting of the measured quantity into another physical quantity. It may also mean a Processing or preprocessing of one or several acquired quantities.

For the calculation of an internally required, desired Performance Ps, the control unit 16, from an engine speed sensor 19, receives an engine speed signal nm, and either a driving pedal signal $\phi$ from a driving pedal generator 20 or a throttle valve angle signal $\alpha$ from a throttle valve angle generator 21. In a charged internal-combustion engine, the control unit 16 receives a charging pressure signal pm from a charging pressure generator 22, and a charge air temperature signal T1 from a charge air temperature generator 23.

An acquisition of a steering angle by means of a steering angle generator 24 is not provided in the basic versions because the control unit 16, ensures an excellent driving behavior without any steering angle signal $\theta$. It is required only for achieving an ultimate refinement and is mentioned only for the sake of completeness.

From the generators 25 and 26 assigned to the wheels 9 and 10, as well as the generators 27 and 28 assigned to the wheels 11 and 12, the control unit 16 receives signals vfl, vfr, vrl and vrr that correspond to the speeds of these wheels at the auxiliary and main driving axles 3, 2.

These signals are also required for a control unit of an antiblock brake system (ABS) so that their signal acquisition, in the case of vehicles that are equipped with a system of this type, may also take place jointly. In effect, these signals are acquired by one of the two systems and are made available to the other system.

An external bus system 29 is also provided at the control unit 16 via which the control unit 16 can communicate with other digital computer systems used in the vehicle for control, measuring and information purposes, such as a control unit of an ABS or an engine management computer (digital engine electronics).

The system may also receive a deceleration signal $-b$ from the control unit of an ABS or of a brake light switch 30, after which the control unit 16, in a vehicle that is equipped with an ABS, controls at least the control element 14 of the longitudinal clutch to such a degree that the ABS can securely detect an occurring brake slip and can have a controlling influence on the proportioning of the braking force.

In vehicles without ABS, it may also be useful to fully control the control elements 13 to 15 during the braking in order to avoid an overbraking of individual wheels or axles.

Also connected to the control unit 16 may be pressure emitters 31, 32 and 33 that output signals corresponding to the control pressures pq, pl, pd at the output of the control elements 13 to 15 for control, monitoring or display purposes.

Figure 3:
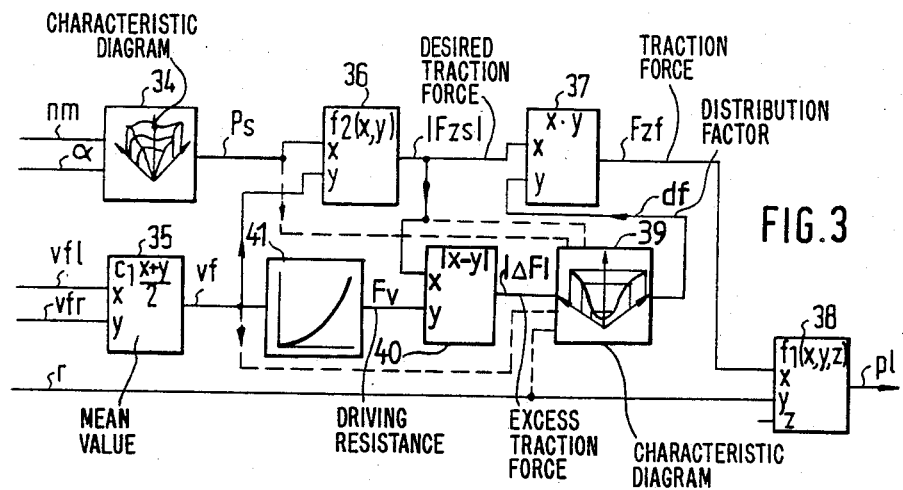
FIG. 3 is a block diagram of a preferred embodiment of a control process implemented on a control unit for the control of a longitudinal clutch.

The block diagram shown in FIG. 3 shows a preferred embodiment of a control process for the control of the longitudinal clutch 7. In this embodiment, a desired performance Ps is predetermined by the driver. For a desired performance Ps such as a momentary engine speed, this value is obtained from the engine speed signal nm and the throttle valve angle signal $\alpha$ or the driving pedal signal $\phi$ by a characteristic diagram 34 of the throttle valve angle/rotational speed. In engines that are equipped, for example, with turbochargers, a charging pressure signal pm and a charge air temperature signal T1 are also supplied to the characteristic diagram 34. In a motor vehicle that is equipped with a digital electronic engine system for the control of the ignition and the injection, as a rule, this system will supply a signal that corresponds to the amount of the desired performance (Ps).

By a mean-value formation 35 that is weighted by a constant $c_1$, a speed vf of the wheels at the auxiliary driving axle that corresponds to the driving speed is determined from the wheel speed signals vfl and vfr. From that or from the desired performance Ps or its amount, an amount of a desired traction force (Fzs) is determined via a second functional relationship $f_2$ (Ps, vf) 36 that is discussed in greater detail below by means of a diagram. This amount of a desired traction force (Fzs) is linked by means of a muliplication 37 with a distribution factor df to a traction force Fzf of the auxiliary driving axle The traction force Fzf is converted by a first functional relationshiP $f_1$ (Fzf, r, p1') 38, into a control quantity p1 for the control of the control element 14 of the longitudinal clutch. The first functional relationship 38 may also be controlled by additional quantities, such as by the control quantity r of the adjusting unit 18 and/or a control value p1' which, however, should be placed at zero here and will be discussed in the following. In the most simple case, the first function relationship $f_1$ (Fzf, r, p1') 38 consists of a constant translation of one of its input quantities into the output quantity (control quantity) pl, but may also be a weighted addition of the input quantities or a weighted maximum value selection from them.

The distribution factor df is obtained from an amount of a traction force excess ($\Delta F$) via a characteristic diagram 39. The traction force excess $\Delta F$ is obtained by means of a difference and amount formation 40 from the amount of the desired traction force (Fzs) and a driving resistance force Fv. This driving resistance force Fv is obtained from the vehicle speed vf from a characteristic driving resistance curve 41.

The distribution factor df, by the first characteristic diagram 39 can, in addition to being determined from the amount of the excess traction force ($\Delta F$), also be determined from: the amount of the desired traction force (Fzs); the desired performance Ps; the speed vf; the control quantity r; or an arbitrary combinaion of these control quantities. It should be noted that the term "characteristic diagram" should be considered to be the characterizing term for a digitized (i.e., acquired at restart points) functional relationship that is stored in a memory area. In the most simple case, the functional relationship maY comprise a constant, a characteristic curve, or a characteristic curve that can be changed by one or several parameters, or even a multidimensional characteristic diagram that depends on several characteristic quantities, in which case a quantization or an interpolation takes place for values between the restart points.

The following should be mentioned: When the amount of the desired traction force (Fzs) is multiplied with a constant value df, the arrangement simulates a transfer transmission with a fixed distribution of the driving torque to the driven axles, more specifically, the simulation of a mechanical transfer transmission by means of an electromechanical arrangement with a controllable clutch.

If the distribution factor df is determined via the first characteristic diagram 39 only from an independent variable—the amount of the traction force excess ($\Delta F$) or the desired traction force (Fzs)—, a characteristic curve has proven to be advantageous that is either constant or linearly sloping downward.

When the desired performance Ps and the speed vf are used as the input quantities, a characteristic diagram is advantageous that: for low values of the amount of Ps and vf first has a constant value of the distribution factor df that corresponds to a maximum value dfmax; for higher values of Ps and vf, has a value of the distribution factor df that corresponds to a falling value; and for still higher values of Ps and vf, has a value of the distribution factor df that corresponds to a minimum value dfmin.

If, in addition, the control quantity r is also processed, a characteristic curve (or a characteristic diagram) of the first characteristic diagram 39 can be changed as a function of r with respect to shape, basic value df min, rise or maximum value df max.

Figure 4:
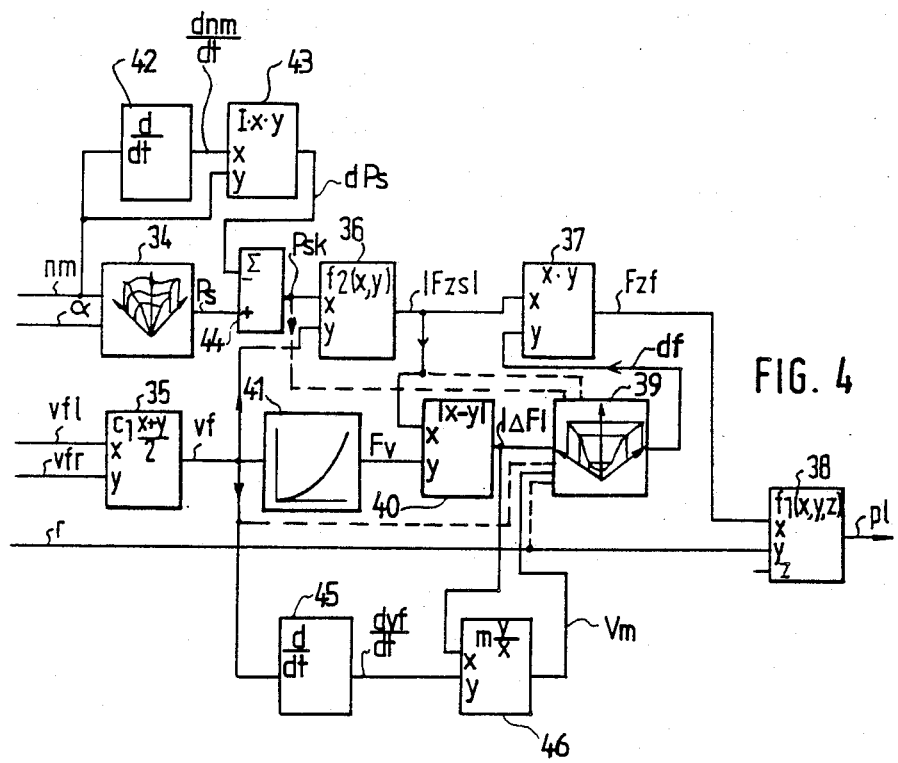
FIG. 4 is a block diagram of the embodiment of FIG. 3 that is expanded by a correction of the desired performance value and a vehicle acceleration compensation.

In FIG. 4, the block diagram according to FIG. 3 is expanded by a desired performance value correction and a vehicle acceleration compensation. For this purpose, the connection between blocks 34 and 36 is separated. From the engine speed nm, its differentiation with respect to time dnm/dt is determined in block 42 and takes place either with discrete values in time (changing of the engine speed dnm during a measuring time dt, divided by it) or continuously (time-related differentiation, analog differentiator). The output signal dnm/dt, in the multiplier 43, is multiplied with the engine speed nm and the moment of inertia I of the drive of the motor vehicle 1. Then, in an adding element 44, the desired performance value signal Ps, along with a dynamic driving performance proportion dPs (flywheel effect compensation), are combined into the corrected desired performance value signal Psk and supplied to block 36.

As an alternative to this or as a supplement, a vehicle acceleration compensation may be provided that takes into account that, when the vehicle accelerates, the front axle is freed from load and the rear axle is additionally loaded. For this purpose, the time-related change of the vehicle speed dvf/dt in block 45 is determined which, as in the case of block 42, may take place in an analog or in a time-discrete way. In a division block 46, the "real acceleration" (i.e., the time-related change of the vehicle speed (dvf/dt)) is divided by the amount of the traction force excess ($\Delta F$) (which results in an "ideal" vehicle acceleration) which is weighted with the reciprocal vehicle mass 1/m (vehicle mass corresponding to the "empty weight"). By means of the resulting "mass" ratio Vm that will finally cause the vehicle acceleration compensation, an additional effect is exercised on the characteristic diagram 39 and thus on the distribution factor df. This distribution factor df, in this case, becomes lower, the higher the real vehicle acceleration.

Figure 5:
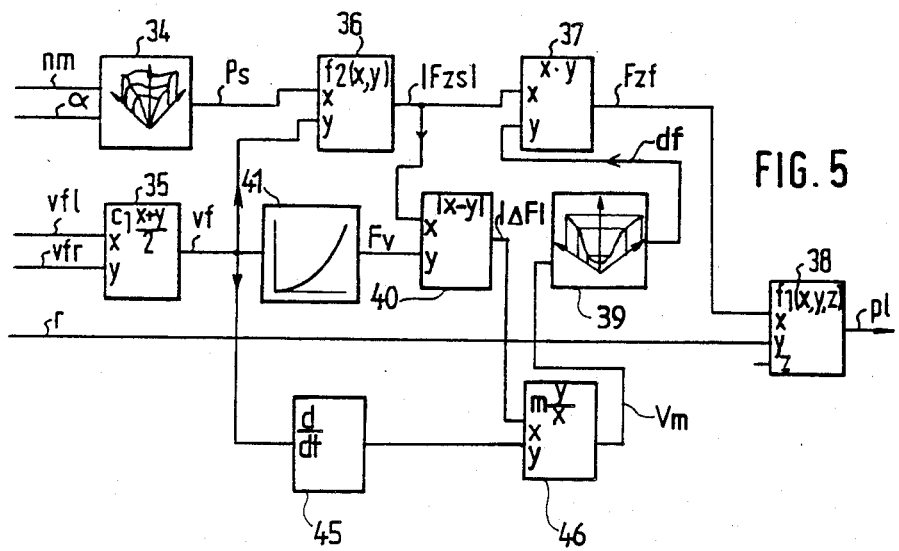
FIG. 5 is a block diagram of another preferred embodiment of a control process according to the invention that is implemented on a control unit.

An additional preferred embodiment is shown in FIG. 5. In this embodiment, the distribution factor df is determined only from the mass ratio Vm causing the vehicle acceleration compensation. This mass ratio Vm, as described above, is determined via the blocks 45 and 46 from the vehicle speed vf and the amount of the excess traction force ($\Delta F$), in which case, the characteristic diagram 39 is reduced to a characteristic curve. Here also, the distribution factor df is again reduced with an increasing real vehicle acceleration, if it is a rear-driven vehicle with a connectable front axle drive. For vehicles with front axle drive and connectable rear axle drive, the distribution factor df is increased with an increasing real vehicle acceleration.

Figure 6:
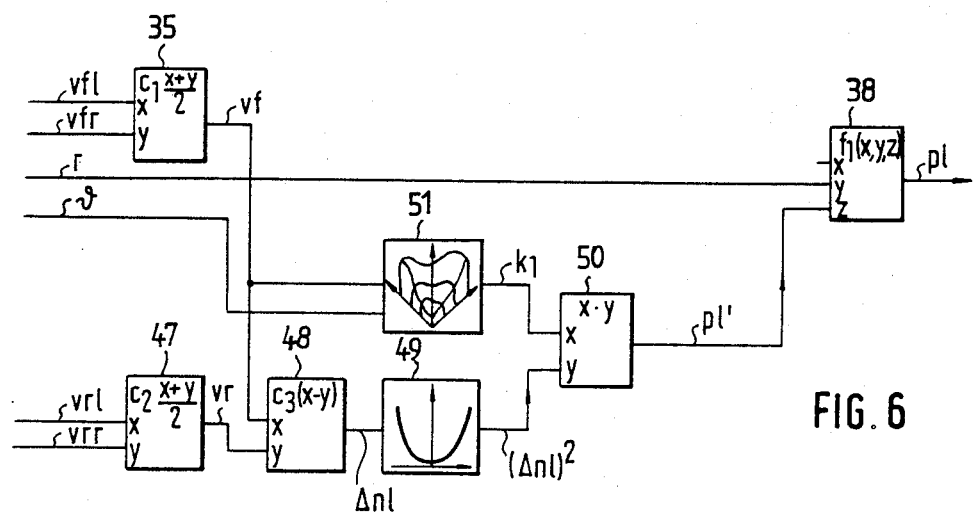
FIG. 6 is a block diagram of another preferred embodiment of a control process implemented on a control unit for the control of a longitudinal clutch.

FIG. 6 shows another control process for the control of the longitudinal clutch 7 which can be combined with the control process according to FIG. 3, as will be explained in detail in FIG. 7. The mean value formation 35 for obtaining vf and the first functional relationship 38 correspond to the relationships described for FIG. 3, with the restriction that now the input quantity Fzf of the first functional relationship 38 is placed at zero and this relationship is acted upon by the control value $p1'$.

By a mean value formation 47 that is weighted with a constant $c_2$, a speed vr of the wheels at the main driving axle 2 is determined from the wheel speed signals vrl and vrr. A difference 48 of the speeds of the auxiliary and main driving axle vf and vr that is weighted with a constant $c_3$ results in a speed difference $\Delta$nl at an input and output shaft of the longitudinal clutch. This difference $\Delta$nl by exponentiating, (preferably by squaring 49) and multiplication 50, is combined with a factor $k_1$ to form the control value $p1'$.

Factor $k_1$ can either be selected to be constant or can be determined by means of a second characteristic diagram 51 from vf and/or the steering angle signal $\theta$.

For a constant factor $k_1$, the control of the longitudinal clutch corresponds to a centrifugal control of the speed difference $\Delta$nl at the longitudinal clutch (clutch slip).

If $k_1$ is determined only from the speed vf, the second characteristic diagram consists of a characteristic curve that rises with an increasing amount of the speed (vf). If, in addition, the steering angle signal $\theta$ is also monitored, the output quantity $k_1$ of the second characteristic field, in the case of an increasing amount of the steering angle, is reduced relatively significantly in order to permit a good steerability of the motor vehicle.

Figure 7:
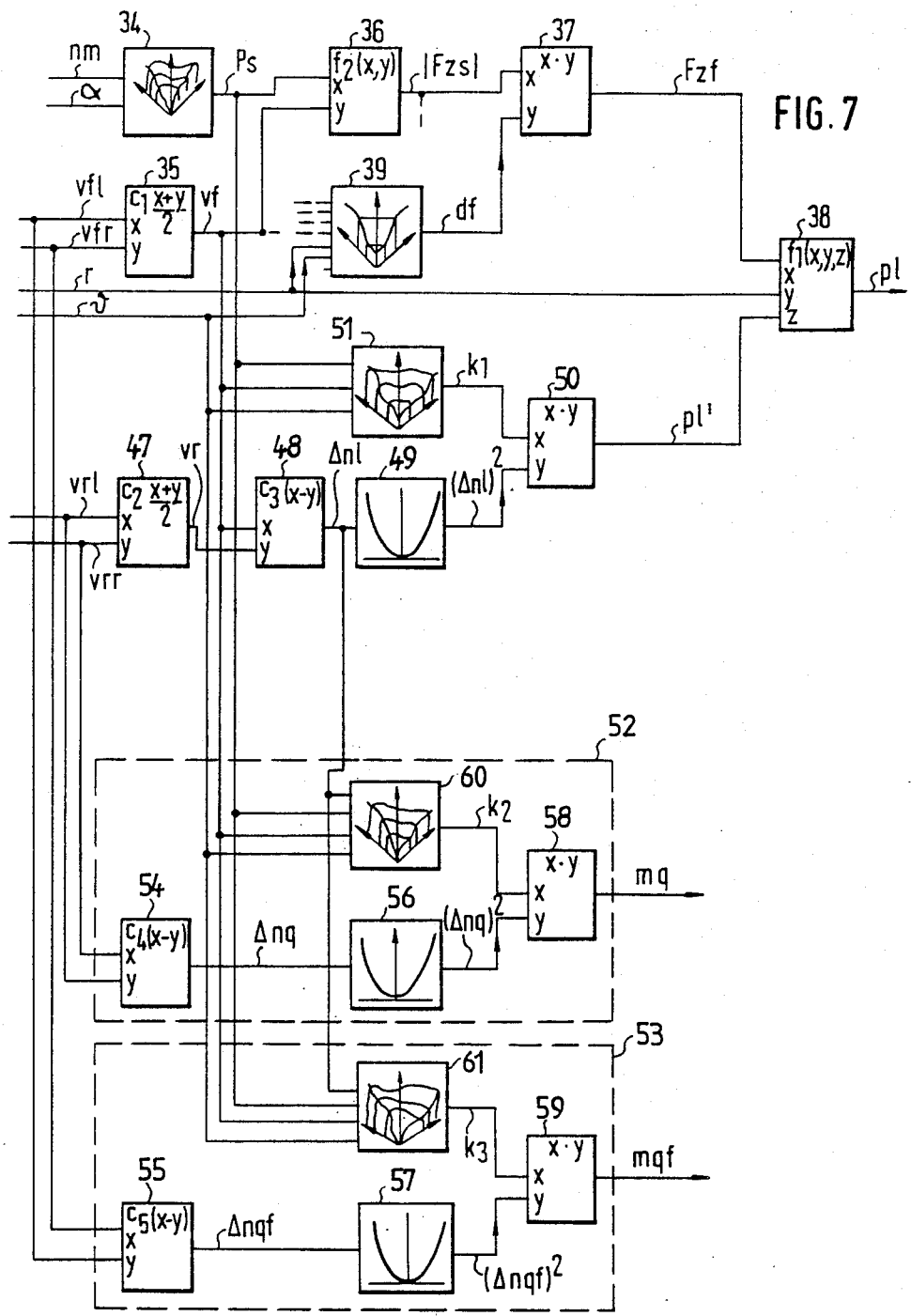
FIG. 7 is a block diagram of a combination of the control processes according to the preferred embodiments of FIGS. 4 and 6 with an expansion for the additional control of differentials at a main driving axle and an auxiliary driving axle;.

A combination of the control processes according to FIGS. 3, 4 or 5 and FIG. 6 or of their output quantitites Fzf and $p1'$ and their joint processing, with the control quantity r, by means of the first functional relationship $f_1$ (Fzf, r, $p1'$) 38 is shown in FIG. 7. FIGS. 3, 4 or 5 are not shown again completely in FIG. 7. Only blocks 34 to 39 were drawn which all of FIGS. 3-5 have in common.

The control process according to FIG. 7, in this case, represents an "overspeeding protection" (limiting of the clutch slip $\Delta$nl), and is therefore extremely useful. In combination, the control process of FIG. 7 is more effective for achieving a good driving behavior than one of the processes alone.

As an expansion, the first characteristic diagram 39 may also be influenced by a steering angle signal $\theta$. With an increasing steering angle, df is reduced relatively significantly. Also shown are function blocks 52 and 53 for controlling a transverse differential 6 of the main driving axle 2 that can be controlled continuously in its locking effect, and a differential 8 of the auxiliary driving axle 3 that can also be controlled continuously in its locking effect.

In this embodiment, the functional sequence for the determination of a locking moment control quantity mq for the control of the transverse differential 6 and of a locking moment control quantity mqf for the control of the differential 8 are largely identical with that for the determination of the control value $p1'$. However, the corresponding characteristic diagram and characteristic quantities require a different, particularly vehicle-specific adaptation.

The difference 54 and 55 of the wheel speed signals vrl and vrr at the main driving axle and vfl and vfr at the auxiliary driving axle is weighted with constants $c_4$ and $c_5$ respectively. This results in a speed difference $\Delta$nq at the output shafts of the transverse differential 6 and $\Delta$nqf at the output shafts of the differential 8. By exponentiating, preferably squaring 56 and 57 and multiplication 58 and 59 with a factor $k_2$ and $k_3$, these speed differences are combined to form the locking moment control quantities mq and mqf.

Factors $k_2$ and $k_3$, in this embodiment, may again be selected to be constant or, by means of a third characteristic diagram 60 or a fourth characteristic diagram 61, may each be determined from the speed difference $\Delta$nl at the input or at the output shaft of the longitudinal clutch. Factors $k_2$ and $k_3$ may also be determined from the desired performance Ps and/or the speed vf of the wheels at the auxiliary driving axle and/or the steering angle signal $\theta$. In this embodiment, the factors $k_2$ and $k_3$ will increase with increasing amounts of the speed difference $\Delta$nl at the longitudinal clutch, the desired performance Ps and the speed vf, and will decrease relatively significantly with an increasing amount of the steering angle, particularly at the axle of the steered wheels. The third characteristic diagram 60 and the fourth characteristic diagram 61 as well as the number and selection of the input quantities, may differ in certain preferred embodiments.

The constants $c_1$ to $c_5$, the first and second functional relationship 38 and 36 and the first to fourth characteristic diagrams are indicated only generally because they require varying adaptations for respective vehicle types. In a preferred embodiment, the constants $c_1$ to $c_5$ are each determined by the wheel diameters and the transmission conditions. For the design of the functional relationships and the characteristic diagrams, the indication of an example, however, would not be very useful. For this reason, only guidelines are supplied with which these can be adapted to different vehicles without undue experimentation by one of ordinary skill in the art.

Figure 8:
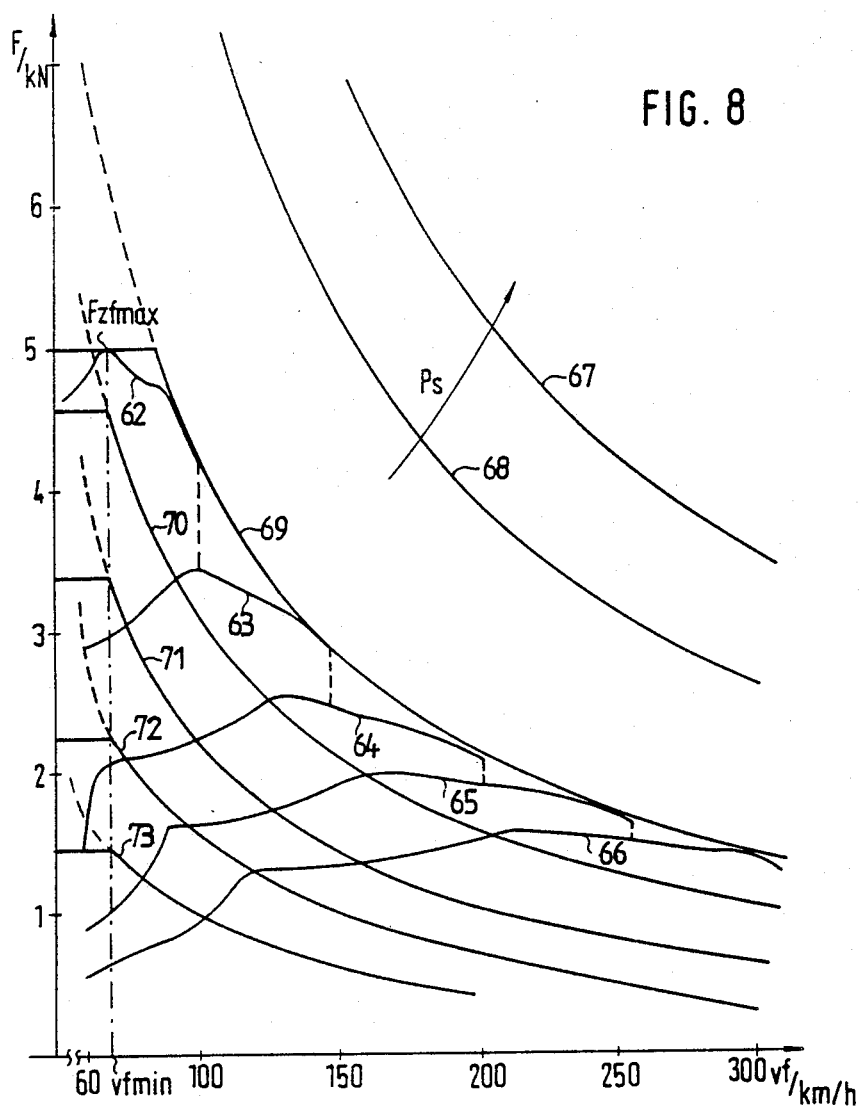
FIG. 8 is a traction force/speed diagram.

Only the second functional relationship $f_2$ (Ps, vf) for the determination of the amount of the desired traction force (Fzs) from the desired performance Ps and the speed vf of the wheels at the auxiliary driving axle will be discussed in detail. This relationship will be explained by means of a speed/traction force diagram according to FIG. 8.

From a purely mathematical point of view, the desired traction force Fzs is calculated from a division of the desired performance Ps by the speed vf. However, for speeds vf to zero, the desired traction force Fzs will go towards infinity. This, for physical reasons, is not plausible since the maximal traction force is limited by the adhesive friction limit between the wheel and the road. In addition, the division by zero occurring in the case of vf =zero, is not permitted in computer technology and generally results in a program termination.

In the speed/traction force diagram, the characteristic speed/traction force curves of gear steps 1 to 5 (62 to 66) of an auxiliary driving axle of a vehicle are shown. These curves 62–66 represent the maximal possible traction forces of the wheels at the auxiliary driving axle of a vehicle in the individual gear steps for corresponding speeds vf. The highest possible value of the traction force Fzfmax of the wheels at the auxiliary driving axle occurs at a speed vfmin on the characteristic curve 62 of gear step 1. A vertical transition that is drawn by an interrupted line from one characterstic curve to the next one symbolizes a necessary shifting process when the maximum speed of the engine is reached.

Characteristic curves 67 to 73 indicate a traction force that pertains to a certain performance Ps=constant for a certain speed vf. They are hyperbolic because the traction force is the result of the division of the desired performance Ps by the speed vf. The characteristic curve 67 may, for example, correspond to a traction force for a maximal possible engine performance.

The characteristic performance curve 69 represents an envelope of the characteristic speed / traction force curves 60 to 66 and is therefore considered to be the maximally possible traction force Fzfmax of the wheels at the auxiliary driving axle.

The calculation of the desired traction force Fzs from the division of the desired perfomance Ps by the speed vf, however, for amounts of speeds smaller than vfmin, for the above-mentioned reasons, is no longer advantageous. In that case, it is better to supply a constant value that is dependent only on the desired performance as the initial value of the second function relationship 36, particularly if the distribution factor df is determined only from the amount of the desired traction force (Fzs) alone. It is advantageous to limit the initial value of the second functional relationship $f_2$ (Ps, vf) to a Fzsmax value that corresponds to the highest possible value of the traction force Fzfmax of the wheels at the auxiliary driving axle for a maximum value of the distribution factor dfmax. These two factual situations are expressed in the bending-away (horizontally extending) parts of the characteristic curves 69 to 73 for the traction force Fzf of the wheels at the auxiliary driving axle for Ps=constant. Otherwise, a maximum value of the traction force Fzf of the auxiliary driving axle would be located at the output of the multiplication 37 that would produce a rigid drive-through to the front axle, which would finally make the vehicle almost unsteerable during starting and maneuvering.

The arrangement is also suitable for a control of a controllable transfer transmission or of an interaxle differential that can be controlled continuously in its locking effect, with the control value pl.

The amount of the desired traction force (Fzs), the distribution factor df, the first, second and third factor $k_1$, $k_2$ and $k_3$ as well as the driving resistance performance Pv are usually determined from the driving speed. Since slip occurs less frequently at the auxiliary driving axle than at the main driving axle, the driving speed may be equalled to the speed of the wheels at the auxiliary driving axle. However, this does not exclude determining the driving speed in a different way. It is contemplated to use no-contact sensors or mean-value formation with respect to the speed of all wheels. Also, the value can be monitored with respect to plausibility in the course of the computing process and in the case of implausible values, be estimated or corrected.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. An arrangement for controlling a power transmission to axles of an all-wheel drive motor vehicle, having a main driving axle equipped with a transverse differential, and an auxiliary driving axle that is driven by a longitudinal clutch and is continuously controllable by control element means and a control unit, said control unit receiving input signals from a plurality of sensors relating to current operational variables of the vehicle and generating a control quantity for controlling said control element means of said longitudinal clutch as a function of at least one traction force of wheels of the vehicle, the improvement comprising:
   means for determining a desired traction force;
   means for determining a driving resistance from a vehicle driving speed from at least one of said input signals from the plurality of sensors relating to current operational variables of the vehicle;
   means for determining an excess traction force as a difference of an amount of said desired traction force and said driving resistance;
   means for determining said traction force as a function of said desired traction force and a distribution factor; and
   means for obtaining said distribution factor according to a first characteristic diagram stored in a memory area wherein said first characteristic diagram defines the distribution factor as a function of at least said excess traction force.

2. An arrangement according to claim 1, wherein said plurality of sensors sense at least one of the following: a driving pedal generator; a throttle valve angle generator; a charging pressure generator; a charge air temperature generator; a steering angle generator; a controllable adjusting unit; and wheel speed generators.

3. An arrangement according to claim 1, further comprising means for determining said control quantity as a function of a speed difference at an input and an output shaft of said longitudinal clutch.

4. An arrangement for controlling a power transmission to axles of an all-wheel drive motor vehicle, having a main driving axle equipped with a transverse differential, and an auxiliary driving axle that is driven by a longitudinal clutch and is continuously controllable by control element means and a control unit, said control unit receiving input signals from a plurality of sensors relating to current operational variables of the vehicle and generating a control quantity for controlling said control element means of said longitudinal clutch as a function of at least one traction force of wheels of the vehicle, the improvement comprising:
   means for determining a desired traction force;
   means for determining a time related change of a vehicle speed from at least one of sad input signals from said plurality of sensors;
   means for determining a driving resistance from a vehicle driving speed from at least one of said input signals from the plurality of sensors relating to current operational variables of the vehicle;
   means for determining an excess traction force as a difference of an amount of said desired traction force and said driving resistance;
   means for determining said traction force as a function of said desired traction force and a distribution factor; and
   means for determining said distribution factor according to a first characteristic diagram stored in a memory area wherein said first characteristic diagram defines said distribution factor as a function of at least said time-related vehicle change and said excess traction force.

5. An arrangement according to claim 4, further comprising:
means for determining said desired traction force as a function of at least a desired performance and said vehicle speed.

6. An arrangement according to claim 4, wherein said plurality of sensors sense at least one of the following: a driving pedal generator; a throttle valve angle generator; a charging pressure generator; a charge air temperature generator; a steering angle generator; a controllable adjusting unit; and wheel speed generators.

7. An arrangement according to claim 4, further comprising means for determining said control quantity as a function of a speed difference at an input and an output shaft of said longitudinal clutch.

8. An arrangement according to claim 5, further comprising means for calculating a dynamic driving performance proportion that causes a compensation of a flywheel effect of a drive of the motor vehicle from an engine speed, a time-related change of said engine speed and a moment of inertia I of the drive;
and means for correcting said desired performance by said dynamic driving performance proportion.

9. An arrangement according to claim 8, further comprising means for obtaining a time related change of the engine speed from a measured time and a speed difference of an engine speed during said measured time.

10. An arrangement according to claim 8, wherein said means for correcting said desired performance corrects said desired performance by at least one of addition or substraction of said desired performance in said dynamic driving performance proportion.

11. An arrangement according to claim 10, further comprising means for determining said time-related change of the engine speed by differentiation.

12. An arrangement according to claim 4, further including means for correcting said distribution factor by a relationship that causes a vehicle acceleration compensation.

13. An arrangement according to claim 12, further comprising means for obtaining said relationship by division of the time-related change of the vehicle speed by an ideal acceleration which is determined by a vehicle mass and an excess traction force.

14. An arrangement according to claim 13, further comprising means for determining said time-related change of the vehicle speed by differentiation.

15. An arrangement according to claim 13, further comprising means for determining said time-related change of the vehicle speed from a measured time and a vehicle speed difference occurring during said measured time.

16. An arrangement according to claim 15, wherein said distribution factor obtained from said first characteristic diagram; decreases for rear-driven vehicles with a connectable front axle drive; and rises for front-driven vehicles with a connectable rear axle drive for increasing amounts of at least one of the following factors: excess traction force; desired traction force; desired performance; vehicle speed; relationship.

* * * * *